Dec. 31, 1957  R. E. JOHNSON  2,818,539
CONTROL APPARATUS FOR ALTERNATING CURRENT MOTORS
Filed June 16, 1955

INVENTOR.
Royce E. Johnson
BY
Carlson, Pitzner, Hubbard & Wolfe
ATTORNEYS

United States Patent Office 2,818,539
Patented Dec. 31, 1957

2,818,539

CONTROL APPARATUS FOR ALTERNATING CURRENT MOTORS

Royce E. Johnson, Rockford, Ill., assignor to Barber-Colman Company, Rockford, Ill., a corporation of Illinois Application June 16, 1955, Serial No. 515,814

8 Claims. (Cl. 318—211)

This invention relates generally to control systems for alternating current motors and, more particularly, to a system for effecting dynamic braking of such motors which are capable of operation as induction generators after the motor is disconnected from its external energizing source.

The general object of the invention is to provide for dynamic braking of motors of the above character by novel apparatus which, as compared to similar apparatus used heretofore, is more effective in stopping the motor quickly and requires fewer components so as to be more economical to manufacture and service.

Another object is to provide novel apparatus for converting the kinetic energy of the motor rotor from the external source to both unidirectional and alternating electric currents and utilizing such currents to brake the rotor.

A further object is to operate the motor as an alternating current generator following its disconnection from the external source and to convert at least a part of the alternating current to direct current which is more effective to brake the rotor.

A more detailed object is to convert the alternating current to direct current by connecting a rectifier to a field winding of the motor in timed relation to interruption of the external source circuit and during the stopping period of the rotor.

A further detailed object is to simplify the timing of completion of the rectifier circuit and interruption of the external source circuit by utilizing the same contact mechanism to control both circuits.

Figure 1:
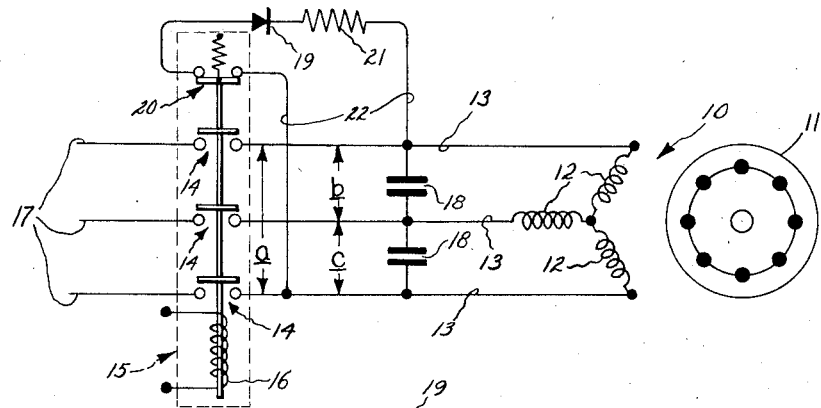

Other objects and advantages of the invention will become apparent from the following detailed description taken in connection with the accompanying drawings, in which Figure 1 is a schematic wiring diagram of a preferred form of control apparatus embodying the novel features of the present invention.

Figure 2:
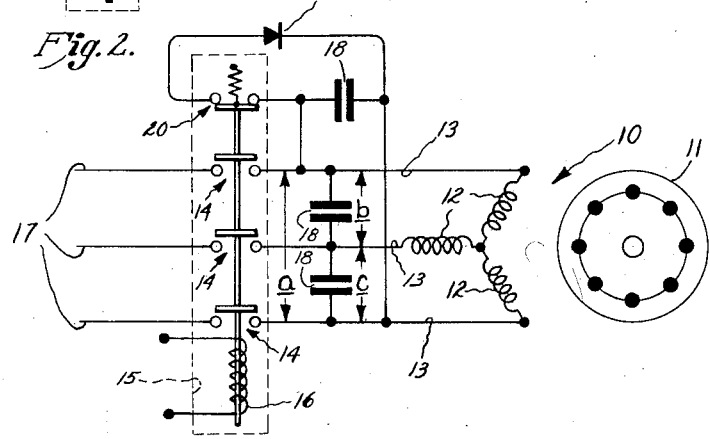
Figure 3:
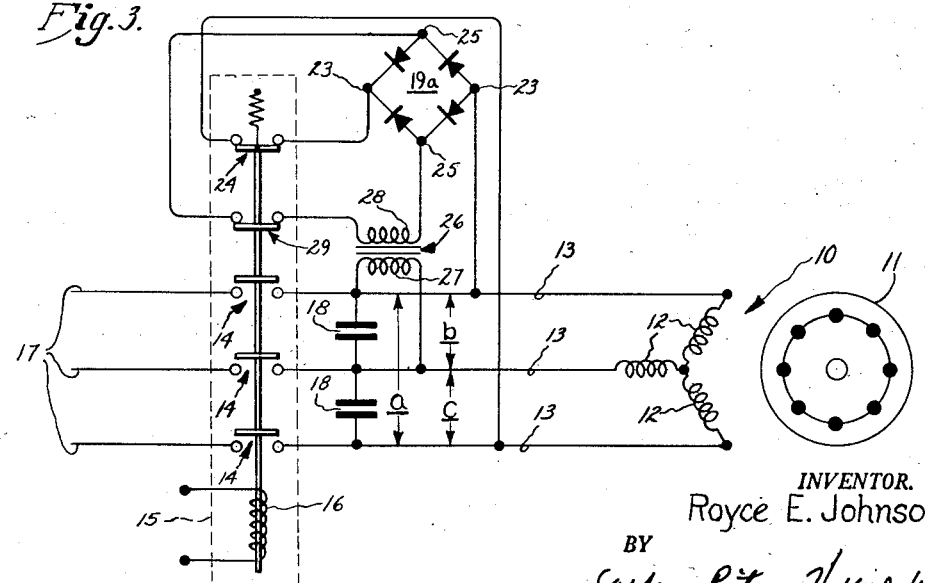

Figs. 2 and 3 are schematic wiring diagrams of modifications of the apparatus.

The present invention is especially applicable to alternating current motors which operate on the induction principle of relative rotation between an electromagnetic field and an armature having closed current conducting paths in which voltages are induced by the relative movement of the field and the armature to provide the motor action. While the invention is shown in the drawings and is described in connection with so-called induction motors having squirrel cage or wound rotors which operate at all times on the induction principle, it is to be understood that I do not intend to be limited by such disclosure but aim to cover all modifications and alternative constructions falling within the spirit and scope of the invention as expressed in the appended claims including the application of the invention to other types of motors such as a synchronous motor in which a winding is short circuited for operation of the motor on the induction principle during a part of its period of use.

The induction motor 10 shown in Figs. 1, 2, and 3 of the drawings is of the three phase type having a rotor 11 and field windings 12 connected in Y. Conductors 13 connect the field windings individually to three sets of normally open contacts 14 of a line contactor 15 which operates, when its coil 16 is energized, to close the contacts and complete energizing circuits for the winding through supply lines or conductors 17 of an external three phase voltage source (not shown). The contacts open automatically to disconnect the field windings from the source when the contactor coil 16 is deenergized.

In accordance with the present invention, direct current for dynamic braking of the rotor 11 following interruption of the line circuits at the contacts 14 is derived from the kinetic energy of the rotor itself thereby avoiding the use of external power for dynamic braking. To this end, one or more capacitors 18 are connected across the field windings 12 for operation of the motor as a self-excited induction generator and novel means is provided to convert at least a part of the resulting alternating current to direct current and apply the same to the field windings in timed relation to interruption of the line circuits by deenergization of the contactor 15 and during the subsequent stopping period of the rotor. In the apparatus shown in Figs. 1 and 2, this means includes a rectifier 19 and a switch 20 for connecting the rectifier across one phase $a$ of the field windings 12.

To simplify the apparatus and the timing of interruption of the line circuits and closure of the rectifier circuit through the switch 20, the rectifier circuit is completed automatically as an incident to deenergization of the contactor coil 16. While this may be accomplished with a separate relay controlled by the line contactor 15, it is preferred that the switch 20 constitute normally closed contacts of the contactor itself as shown. If desired, a resistor 21 may be connected in series with the rectifier 19 to control the magnitude of the direct current and thereby the stopping time of the rotor 11. The rectifier 19 in the preferred circuit of Fig. 1 is a half wave rectifier of the selenium dry plate type and is connected in series with the contacts 20 across one phase $a$ by conductors 22.

The number of capacitors 18 used in the preferred apparatus of Fig. 1 is two, these being connected individually across the second and third phases $b$ and $c$ of the field windings 12. While such connection may be made after interruption of the line circuits, it is preferred to connect the capacitors across the two phases permanently to avoid switching and to initiate the generator action as soon as the line circuits are interrupted, the capacitors then serving to improve the power factor of the motor during its normal operation as a motor. The most effective generator action is obtained with three capacitors, one connected across each phase, as shown in the modified circuit Fig. 2, this number of capacitors providing a balanced power factor for the three phases which is desirable in some larger motor installations. However, the use of two capacitors has been found to be satisfactory for smaller motors with ratings on the order of ½ horsepower and is preferred in order to reduce the cost of the apparatus.

In the operation of the preferred apparatus of Fig. 1 and the modified circuit of Fig. 2, let it be assumed that the line contactor 15 is energized with its line contacts 14 closed and the rectifier contacts 20 open so that the motor is running and the rectifier circuit is interrupted. As soon as the contactor is deenergized, the line contacts 14 open and the motor operates as a generator of alternating current due to the capacitors 18. Following a momentary delay equal to the translation time of the movable contactor parts, the rectifier contacts 20 are closed to connect the rectifier across its phase $a$ of the field windings 12. The current in this phase then a unidirectional or half-wave rectified component which produces a stationary electromagnetic field which is traversed by the rotor conductors. The voltage thereby induced in the conductors results in a current flow in the conductors with an accompanying power loss and dissipation of the kinetic energy of the rotor. The field due to the direct current being stationary relative to the rotor, this field is more effective for braking than the alternating current field which tends to rotate with the rotor. The combined dissipation due to the direct current and the alternating currents reduces the kinetic energy and thereby the speed of the rotor quickly. Since the direct dynamic braking current is derived from the kinetic energy of the rotor itself, the rectifier circuit may remain closed after the rotor stops and until the line contactor 15 is reenergized for motor operation, no current flowing in any of the circuits before such reenergization.

When used with a ½ horsepower, 220 volt, three phase induction motor, apparatus like that of Fig. 1 described above with only two capacitors 18 was effective in stopping the rotor in .87 of a revolution where the rated speed of the motor was 1800 R. P. M. and a simulated torque load of 1.4 pound-inches of friction was applied to the motor shaft. In this case, the motor used was model 5K43JG2, form G, manufactured by General Electric Company, Schenectady, New York, and the value of each of the capacitors was 60 microfarads, the translation time for closing the rectifier switch contacts following deenergization of the line contactor being approximately .015 of a second during which the rotor rotated about a half revolution.

While the single half wave rectifier is preferred to keep the cost of the apparatus low, a more effective braking action may be obtained, if desired, by the use of a full wave rectifier 19ª as shown in Fig. 3. In this case, the output terminals 23 of the rectifier are connected across the phase $a$ of the field windings 12 through normally closed contacts 24 of the contactor 15. The self induced alternating current of the second phase $b$ is applied to the input terminals 25 of the rectifier through a transformer 26 having its primary winding 27 connected across the second phase $b$ and its secondary winding 28 connected to the input terminals through an additional set 29 of normally closed contacts of the line contactor. The purpose of the transformer is to isolate the input terminals of the rectifier from the output terminals and avoid a short circuit around the rectifier. In operation, this modified apparatus is similar to that of Figs. 1 and 2 except that more direct current is available for dynamic brake due to full rectification of the alternating current.

It will be apparent that the novel apparatus described above, by converting the kinetic energy of the rotor 11 to direct current for dynamic braking, makes direct current available without an external power source and the extra switching mechanism required to disconnect the source after the rotor has stopped. Such conversion to direct current in proper timed relation to interruption of the line circuits to the field winding is achieved simply by utilizing only one additional set of contacts of the line contactor 15 for completing the circuit to the rectifier 19. The apparatus thus effects dynamic braking of the rotor quickly with few parts which are of low cost both in manufacture and maintenance.

I claim as my invention:

1. The combination of, a three phase induction motor having three terminals, a line contactor having three sets of normally open contacts connected to said three terminals and adapted to be connected to power supply conductors for energization of the motor when the contacts are closed, capacitors connected individually between different pairs of said terminals on the motor side of said contacts to cause operation of said motor as an alternating current generator during the period of continued rotation of the rotor of said motor after said contacts are opened, a full wave rectifier having input and output terminals, a first circuit connecting said rectifier output terminals to two of said motor terminals, a transformer having a primary winding connected between two of said motor terminals on the motor side of said contacts, a second circuit connecting the secondary winding of said transformer to said rectifier input terminals, and means operating in timed relation to opening and closing of said contacts for maintaining said circuits open during closure of the contacts and for closing said circuits during said period following opening of the contacts to convert at least a part of the alternating current generated during the period to direct current and apply the same to said motor terminals of said first circuit for dynamic braking of the rotor of said motor.

2. The combination of, an alternating current induction motor, a line contactor having normally open contacts connected to the field windings of said motor and adapted to be connected to power supply conductors for energization of the motor when the contacts are closed, capacitor means connected to said field windings for operation of said motor as an alternating current generator during the period of rotation of the rotor of said motor following opening of said contacts, a full wave rectifier having input and output terminals, a transformer having a primary winding connected to said field windings on the motor side of said contacts, a first circuit operable when closed to connect the secondary winding of said transformer to said input terminals of said rectifier, and a second circuit operable when closed to connect said rectifier output terminals to said field windings on the motor side of said contacts, said circuits including normally closed contacts of said contactor for closure of the circuits when said normally open contacts are open.

3. The combination of, an alternating current induction motor, a line contactor having normally open contacts connected to the field windings of said motor and adapted to be connected to a power supply line for energization of the motor when the contacts are closed, capacitor means connected to said field windings for operation of said motor as an alternating current generator during the period of rotation of the rotor of said motor following opening of said contacts, a full wave rectifier having input and output terminals, a transformer having a primary winding connected to said field windings on the motor side of said contacts and a secondary winding connected to said input terminals of said rectifier, a circuit operable when closed to connect said rectifier output terminals to said field windings on said motor side of said contacts, and means for closing said circuit in timed relation to opening of said contacts and during said period of rotation of said rotor.

4. The combination of, a three phase induction motor, a line contactor having three sets of normally open contacts connected to the three phases of said motor and adapted to be connected to a power supply line for energization of the motor when the contacts are closed, three capacitors connected individually across each of said phases on the motor side of said contacts for operation of the motor as an alternating current generator during the period of continued rotation of the rotor of said motor following opening of the contacts, said contactor having a set of normally closed contacts, and a rectifier connected in series with said normally closed contacts across one of said phases on the motor side of said normally open contacts to convert at least a part of the alternating current to direct current for dynamic braking of said rotor when the normally open contacts are opened.

5. The combination of, a three phase induction motor, a line contactor having three sets of normally open contacts connected to the three phases of said motor and adapted to be connected to a power supply line for energization of the motor when the contacts are closed, two capacitors one connected across each of two of said phases on the motor side of said contacts to cause operation of said motor as an alternating current generator during the period of continued rotation of the rotor of said motor after the contacts are open to interrupt the power supply circuits to said phases, said contactor having normally closed contacts, and a rectifier connected across one of said phases in series with said normally closed contacts for completion of a circuit through the rectifier and the third phase to cause a direct current to flow in the third phase for dynamic braking of said rotor when said normally open contacts are open.

6. The combination of, an alternating current induction motor having a rotor and field windings, a line contactor for connecting said field windings to a power supply line for energization of the motor when the contactor is energized and for deenergization of the motor when the contactor is deenergized, capacitor means adapted to be connected to said field windings on the motor side of said contactor for operation of the motor as a generator during the period of rotation of said rotor following interruption of the line circuits through said contactor, a rectifier for converting at least a part of the alternating current generated during said period to direct current, and a circuit controlled by said contactor and completed in response to deenergization thereof to connect said rectifier to said field windings on the motor side of the contactor and apply said direct current to the latter during said period for dynamic braking of said rotor.

7. The combination of, an alternating current induction motor having a rotor and field windings, a line contactor for connecting said field windings to power supply conductors for energization of the motor, capacitor means adapted to be connected to said field windings on the motor side of said contactor for operation of the motor as a generator during the period of rotation of said rotor following interruption of the line circuits through said contactor, a rectifier for converting at least a part of the alternating current generated during said period to direct current, and means operable to connect said rectifier to said field windings on the motor side of the contactor for application of said direct current to the latter in timed relation to operation of said contactor and during said period for dynamic braking of said rotor.

8. The combination of, an induction motor having a rotor and field winding means, a line contactor connected to said field winding means and operable to connect the same to a power supply line for energization of the motor and rotation of said rotor when the contactor is energized and to disconnect the winding means from the supply line when the contactor is deenergized, capacitor means adapted to be connected to said field winding means on the motor side of said contactor to cause operation of said motor as a generator with an alternating current induced in the field winding means during the period of continued rotation of said rotor after said contactor is deenergized, and circuit means operable when activated to convert at least a part of said alternating current in said field winding means to direct current and to apply such direct current to said field winding means for dynamic braking of said rotor, said circuit means including a rectifier and a switch operated in timed relation to deenergization of said contactor and during said period of continued rotor rotation to activate the circuit means by connecting the rectifier to said field winding means on the motor side of said contactor.

References Cited in the file of this patent

UNITED STATES PATENTS

| 2,445,430 | Herchenroeder et al. | July 20, 1948 |

FOREIGN PATENTS

| 682,206 | Germany | Oct. 10, 1939 |
| 731,765 | Germany | Feb. 15, 1943 |